United States Patent [19]

May et al.

[11] 4,303,568

[45] Dec. 1, 1981

[54] CORROSION INHIBITION TREATMENTS AND METHOD

[75] Inventors: Roger C. May, Glenside; Gary E. Geiger, Philadelphia, both of Pa.

[73] Assignee: Betz Laboratories, Inc., Trevose, Pa.

[21] Appl. No.: 101,658

[22] Filed: Dec. 10, 1979

[51] Int. Cl.$^3$ .................... C08L 31/02; C08L 33/02

[52] U.S. Cl. .................... 260/29.6 MP; 106/14.12; 252/181; 252/389 A; 422/13

[58] Field of Search .............. 260/29.6 MP; 252/180, 252/181, 389 A; 106/14.12; 422/13

[56] References Cited

U.S. PATENT DOCUMENTS

| | | | |
|---|---|---|---|
| 3,837,803 | 9/1974 | Carter et al. | 422/2.7 |
| 3,891,568 | 6/1975 | Nishio et al. | 252/181 |
| 3,941,562 | 3/1976 | Hollingshad | 252/181 |
| 3,992,318 | 11/1976 | Gaupp et al. | 252/181 |
| 4,029,577 | 6/1977 | Godlewski et al. | 210/58 |
| 4,134,959 | 1/1979 | Menke et al. | 252/181 |
| 4,149,969 | 4/1979 | Robitaille et al. | 252/181 |
| 4,202,796 | 5/1980 | Jacob et al. | 106/14.12 |
| 4,209,398 | 6/1980 | Ii et al. | 210/58 |

*Primary Examiner*—John Kight, III
*Assistant Examiner*—Amelia B. Yarbrough
*Attorney, Agent, or Firm*—Alexander D. Ricci; Bruce E. Peacock

[57] ABSTRACT

The invention deals with a method and composition(s) for use in inhibiting corrosion of metallic parts in contact with aqueous systems. It has been discovered that protective oxide films can be formed on the metallic surface if such is allowed to contact an aqueous system containing a sufficient amount for the purpose of a polymer composed primarily of acrylic moieties and hydroxylated lower alkyl acrylate moieties and a water-soluble orthophosphate. Optionally but desirably, polyphosphates, organo-phosphonates, and copper corrosion inhibitors may be included.

46 Claims, No Drawings

CORROSION INHIBITION TREATMENTS AND METHOD

TECHNICAL BACKGROUND

The treatment of industrial water systems, particularly cooling water systems, has over the past 25 years been subject to significant changes. The most prominently recognized treatment for cooling water systems came in the form of Betz Laboratories, Inc.'s Dianodic ® and Zinc-Dianodic product lines. These lines made use of the exceptional capacity of the chromate component in inducing the formation of a passive oxide film, believed to be primarily gamma-ferric oxide, on the metallic surfaces which provided protection against corrosion. The chromates, when used in conjunction with polyphosphates, zinc and in some cases orthophosphates, provided protection which until recently was basically unduplicatable with other treatments. In this regard, U.S. Pat. Nos. 2,711,391; 2,793,932; 2,848,299; 2,872,281; and 2,900,222 can be noted.

With the advent of Federal, State and Municipal environmental controls, however, chromate became suspect for its environmental impact on streams, ponds, lakes, etc., where it might be discharged. Some industries, particularly the petroleum refining, petrochemical, chemical and steel industries, because of each's awareness of the excellent passivation provided by the chromates through the formation of a passive oxide film, decided to continue to use the chromate treatments, with the attendent high capital expenditures for either chromate removal or recovery systems, or for disposing of reduced chromate obtained by the natural treatment of effluents. Other industries, on the contrary, have utilized treatments which avoided the use of chromates. Since chromates are superb corrosion inhibitors, systems such as cooling water systems, were maintained in the acid range, thereby avoiding the pH's where calcium carbonate and magnesium carbonate normally form and precipitate.

With the prohibitions relative to the use of chromate, treatment programs were utilized which made use of the controlled precipitation of calcium phosphate and/or carbonate to form a protective barrier on the surface of the metallic parts (generally ferrous metals) to provide corrosion protection through cathodic action. These programs utilized orthophosphates, polyphosphates, phosphonic acid compounds and their salts. Although these programs were reasonably successful, they did not provide the protection established by the passive oxide film induced by chromate treatments. Moreover, these programs, because of the need for narrow ranges of pH control, were virtually unforgiving, i.e., if concentration of the calcium ion, the phosphate and phosphonate were excessive for a particular pH, uncontrolled precipitation occurred, which on many occasions blocked the metal pipes which the programs were attempting to protect. Control of the operating parameters and conditions was extremely critical.

These treatments, although the best available at the time, did provide reduced heat transfer because of the deposited materials, but also negatively effected production because they did impede flow, for example, of the cooling water. Each of these factors had a direct effect on energy costs, since more energy was required to provide commensurate production to that achieved when chromate was used.

Typical of the chromate-free treatments are those specified in Vogt et al U.S. Pat. No. 3,837,803, which is hereby incorporated herein in its totality by reference thereto. One of the objects of this invention is to improve upon the invention of the above-identified patent.

Until the advent of the present invention the use of the passivated oxide film for corrosion protection has, with the exception of those systems using chromate, been limited since no practical and effective manner has been discovered to provide such in the absence of chromate. Inorganic phosphates, although having the capacity, could not be used effectively. The present inventors, after much investigation, have discovered a treatment(s) which has successfully established the much desired but elusive passive oxide film (also believed to be a gamma-ferric oxide film) on ferrous-based metallic surfaces in contact with aqueous systems, and in particular cooling water systems.

The present inventors discovered that if the aqueous medium contained in or being conveyed by a metallic system was first adjusted to a pH of 5.5 or above, & secondly measured to assure a particular calcium ion content, that the illustrative passive oxide film is formed upon the metallic surfaces to thereby protect such from corrosion through the use of a treatment comprised of an inorganic orthophosphate such as those listed in U.S. Pat. No. 3,837,803 in column 5, lines 1 through 34, together with a water-soluble polymer composed primarily of moieties derived from acrylic acid (or its water-soluble salts) and moieties derived from an hydroxy lower alkyl acrylate. Additional protection is obtained by including in the treatment water-soluble polyphosphates and/or water-soluble organo-phosphonic acid derivatives (or salts thereof). The organo-phosphonic acid derivatives contemplated for use in accordance with the present invention are those disclosed in columns 5 through 9 of U.S. Pat. No. 3,837,803. The polyphosphates operable are those generally used for corrosion inhibition purposes and which will be described more fully later herein.

While the treatments of the invention are effective alone, it is desirable to where copper corrosion is a problem to include copper corrosion inhibitors such as benzotriazole, mercaptobenzothiazole, mercaptobenzothiol, totyltriazole, etc., in the composition or in the treatment.

SPECIFICS OF THE INVENTION

The Orthophosphate Constituent

The water-soluble orthophosphate compounds which are operable for the present purposes generally include phosphoric acid, the sodium orthophosphates, the potassium orthophosphates, the lithium orthophosphates and ammonium orthophosphates. The following specific compounds may be mentioned as exemplary:

| | |
|---|---|
| $H_3PO_4$ | phosphoric acid |
| $LiH_2PO_4$ | lithium di acid phosphate |
| $Na_3PO_4$ | trisodium orthophosphate |
| $Na_2HPO_4$ | disodium orthophosphate |
| $NaH_2PO_4$ | monosodium orthophosphate |
| $NaH_3(PO_4)_2$ | hemisodium orthophosphate |
| $K_3PO_4$ | tripotassium orthophosphate |
| $K_2HPO_4$ | dipotassium orthophosphate |
| $KH_2PO_4$ | monopotassium orthophosphate |
| $(NH_4)_3PO_4$ | triammonium orthophosphate |
| $(NH_4)_2HPO_4$ | diammonium orthophosphate |

| | |
|---|---|
| -continued | |
| (NH$_4$)H$_2$PO$_4$ | monoammonium orthophosphate |

In addition to the inorganic orthophosphates set forth above may be mentioned the organic orthophosphates which are set forth in U.S. Pat. No. 3,510,436. The specific compounds are those which possess the basic formula

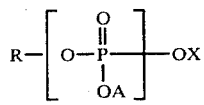

where R is an organic radical as described in the patent, X is A or R, and A is H, Na, Li, K or NH$_4$. Compounds of the above nature are an excellent source of orthophosphate.

The Polymer

The polymers according to the present invention are those effective for the purpose which contain essentially moieties derived from an acrylic acid compound (AA), i.e.,

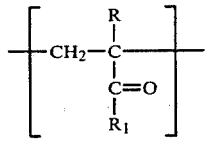

where R is hydrogen or a lower alkyl of from 1 to 3 carbon atoms and R$_1$=OH, NH$_2$ or OM, where M is a water-soluble cation, e.g., NH$_4$, alkali metal (K, Na), etc.; and moieties of an hydroxylated lower alkyl (C$_2$-C$_6$) acrylate (HAA) as represented, for example, by the formula:

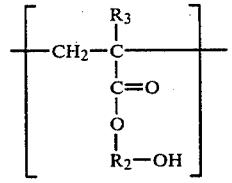

where R$_3$ is H or lower alkyl of from 1 to 3 carbon atoms, and R$_2$ is a lower alkyl having from about 2 to 6 carbon atoms.

In terms of mole ratios, the polymers are considered, most broadly, to have a mole ratio of AA:HAA of from about 1:4 to 36:1. This mole ratio is preferably about 1:1 to 11:1, and most preferably about 1:1 to 5:1. The only criteria that is considered to be of importance with respect to mole ratios is that it is desirable to have a copolymer which is water-soluble. As the proportion of hydroxylated alkyl acrylate moieties increases, the solubility of the copolymer decreases. It is noted that, from an efficacy point of view, the polymers having a mole ratio of AA:HAA of 1:1 to 5:1 were considered the best.

The polymers could have a molecular weight of from about 1,000 to about 50,000, with from about 2,000 to about 6,000 being preferred.

The polymers utilized in accordance with the invention are described together with their methods of manufacture in U.S. Pat. No. 4,029,577. This patent, which is hereby incorporated herein by reference thereto is directed to the use of the subject polymers for the dispersion of iron oxide, clay, and the treatment of calcium phosphate.

The polymer prepared either by copolymerization of AA with hydroxy propyl acrylate (HPA) or reaction of AA with propylene oxide would be composed of units or moieties having the structural formulas:

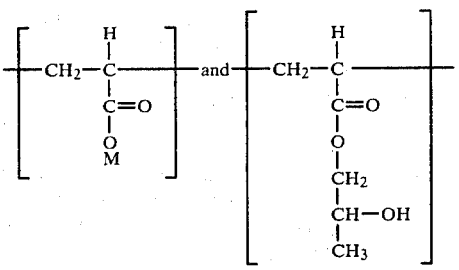

where M is as earlier defined.

The Polyphosphates

The water-soluble polyphosphate compounds which are operable for the present purposes generally include the sodium polyphosphates, the potassium polyphosphates, the lithium polyphosphates and ammonium polyphosphates. The following specific compounds may be mentioned as exemplary:

| | |
|---|---|
| Na$_5$P$_3$O$_{10}$ | sodium tripolyphosphate |
| Na$_4$P$_2$O$_7$ | tetrasodium pyrophosphate |
| Na$_2$H$_2$P$_2$O$_7$ | disodium pyrophosphate |
| (NaPO$_3$)$_6$ | sodium hexametaphosphate |
| K$_4$P$_2$O$_7$ | tetrapotassium pyrophosphate |
| Na$_2$(NH$_4$)$_2$P$_2$O$_7$ | sodium ammonium pyrophosphate |
| Na$_4$HP$_3$O$_{10}$ . 1.5H$_2$O | sodium acid tripolyphosphate |
| K$_5$P$_3$O$_{10}$ | potassium tripolyphosphate |
| Na$_6$P$_4$O$_{13}$ | sodium tetrapolyphosphate |
| Na$_3$P$_3$O$_9$ | sodium trimetaphosphate |
| Na$_4$P$_4$O$_{12}$ | sodium tetrametaphosphate |
| (NaPO$_3$)$_7$ | sodium heptametaphosphate |
| (NaPO$_3$)$_8$ | sodium octametaphosphate |

Additional polyphosphates which are utilizable under the present concept are set forth in the publication entitled *Phosphorous and Its Compounds*, J. R. Van Wazer, Vol. 1, page 601 et seq. Basically, any polyphosphate which is known to inhibit corrosion in aqueous systems may be utilized.

The Organo-Phosphonic Acid Derivatives

The organo-phosphonic acid compounds are those having a carbon to phosphorus bond, i.e.,

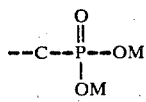

Compounds within the scope of the above description generally are included in one of perhaps 3 categories which are respectively expressed by the following general formulas:

$$R-\underset{\underset{OM}{|}}{\overset{\overset{O}{\|}}{P}}-OM \quad (1)$$

where R is a lower alkyl having from about one to six carbon atoms, e.g., methyl, ethyl, butyl, propyl, isopropyl, pentyl, isopentyl and hexyl; substituted lower alkyl of from one to six carbon atoms, e.g., hydroxyl and amino-substituted alkyls; a mononuclear aromatic (aryl) radical, e.g., phenyl, benzene, etc., or a substituted mononuclear aromatic compound, e.g., hydroxyl, amino, lower alkyl substituted aromatic, e.g., benzyl phosphonic acid; and M is a water-soluble cation, e.g., sodium, potassium, ammonium, lithium, etc. or hydrogen.

Specific examples of compounds which are encompassed by this formula include:

methylphosphonic acid $CH_3PO_3H_2$ ethylphosphonic acid $CH_3CH_2PO_3H_2$ 2-hydroxyethylphosphonic acid $$\underset{\underset{OH}{|}}{CH_2}-CH_2-PO_3H_2$$

2-amino-ethylphosphonic acid $$\underset{\underset{NH_2}{|}}{CH_2}-CH_2-PO_3H_2$$

isopropylphosphonic acid $$\underset{\underset{\phantom{|}}{}}{CH_3-\overset{\overset{CH_3}{|}}{CH}-CH_2-PO_3H_2}$$

benzene phosphonic acid
$C_6H_5-PO_3H_2$ benzylphosphonic acid
$C_6H_5CH_2PO_3H_2$ $$MO-\overset{\overset{O}{\|}}{\underset{\underset{OM}{|}}{P}}-R_1-\overset{\overset{O}{\|}}{\underset{\underset{OM}{|}}{P}}-OM \quad (2)$$

wherein $R_1$ is an alkylene having from about one to about 12 carbon atoms or a substituted alkylene having from about 1 to about 12 carbon atoms, e.g., hydroxyl, amino, etc. substituted alkylenes, and M is as earlier defined for (1) above.

Specific exemplary compounds and their respective formulas which are encompassed by the above formula are as follows:

methylene diphosphonic acid
$H_2O_3P-CH_2-PO_3H_2$ ethylidene diphosphonic acid $H_2O_3P-CH(CH_3)PO_3H_2$ isopropylidene diphosphonic acid $(CH_3)_2C(PO_3H_2)_2$ 1-hydroxy, ethylidene diphosphonic acid (HEDP)

$$H_2O_3P-\overset{\overset{OH}{|}}{C}(CH_3)-PO_3H_2$$

hexamethylene diphosphonic acid $H_2O_3P-CH_2(CH_2)_4CH_2-PO_3H_2$ trimethylene diphosphonic acid $H_2O_3P-(CH_2)_3-PO_3H_2$ decamethylene diphosphonic acid
$H_2O_3P-(CH_2)_{10}-PO_3H_2$ 1-hydroxy, propylidene diphosphonic acid
$H_2O_3PC(OH)CH_2(CH_3)PO_3H_2$ 1,6-dihydroxy, 1,6-dimethyl, hexamethylene diphosphonic acid $H_2O_3PC(CH_3)(OH)(CH_2)C(CH_3)(OH)PO_3H_2$ dihydroxy, diethyl ethylene diphosphonic acid $H_2O_3PC(OH)(C_2H_5)C(OH)(C_2H_5)PO_3H_2$ $$\underset{R_4}{\overset{R_3}{\diagdown}}N-R_2-\overset{\overset{O}{\|}}{\underset{\underset{OM}{|}}{P}}-OM \quad (3)$$

where $R_2$ is a lower alkylene having from about one to about four carbon atoms, or an amine or hydroxy substituted lower alkylene; $R_3$ is $[R_2-PO_3M_2]$, H, OH, amino, substituted amino, an alkyl having from one to six carbon atoms, a substituted alkyl of from one to six carbon atoms (e.g., OH, $NH_2$ substituted), a mononuclear aromatic radical and a substituted mononuclear aromatic radical (e.g., OH, $NH_2$ substituted); $R_4$ is $R_3$ or the group represented by the formula $$\left[\left(\underset{\underset{R_6}{|}}{\overset{\overset{R_5}{|}}{C}}\right)_n-\underset{\underset{R_7}{|}}{N}\right]_y-R_2-\overset{\overset{O}{\|}}{\underset{\underset{OM}{|}}{P}}-OM$$

where $R_5$ and $R_6$ are each hydrogen, lower alkyl of from about one to six carbon atoms, a substituted lower alkyl (e.g., OH, $NH_2$ substituted), hydrogen, hydroxyl, amino group, substituted amino group, a mononuclear aromatic radical, and a substituted mononuclear aromatic radical (e.g., OH and amine substituted); R is $R_5$, $R_6$, or the group $R_2-PO_3M_2$ ($R_2$ is as defined above); n is a number of from 1 through about 15; y is a number of from about 1 through about 14; and M is as earlier defined.

Compounds or formulas therefore which can be considered exemplary for the above formulas are as follows:

nitrilo-tri(methylene phosphonic acid)

$$N(CH_2PO_3H_2)_3$$

imino-di(methylene phosphonic acid)

$$NH(CH_2PO_3H_2)_2$$

n-butyl-amino-di(methyl phosphonic acid)

$$C_4H_9N(CH_2PO_3H_2)_2$$

decyl-amino-di(methyl phosphonic acid)

$$C_{10}H_{21}N(CH_2PO_3H_2)_2$$

trisodium-pentadecyl-amino-di-methyl phosphate $$C_{15}H_{31}N(CH_2PO_3HNa)(CH_2PO_3Na_2)$$

n-butyl-amino-di(ethyl phosphonic acid)

$$C_4H_9N(CH_2CH_2PO_3H_2)_2$$

tetrasodium-n-butyl-amino-di(methyl phosphate)

$$C_4H_9N(CH_2PO_3Na_2)_2$$

triammonium tetradecyl-amino-di(methyl phosphate)

$$C_{14}H_{29}N(CH_2PO_3(NH_4)_2)CH_2PO_3HNH_4$$

phenyl-amino-di(methyl phosphonic acid)

$$C_6H_5N(CH_2PO_3H_2)_2$$

4 hydroxy-phenyl-amino-di(methyl phosphonic acid)

$$HOC_6H_4N(CH_2PO_3H_2)_2$$

phenyl propyl amino-di(methyl phosphonic acid)

$$C_6H_5(CH_2)_3N(CH_2PO_3H_2)_2$$

tetrasodium phenyl ethyl amino-di(methyl phosphonic acid)

$$C_6H_5(CH_2)_2N(CH_2PO_3Na_2)_2$$

ethylene diamine tetra(methyl phosphonic acid)

$$(H_2O_3PCH_2)_2N(CH_2)_2N(CH_2PO_3H_2)_2$$

trimethylene diamine tetra(methyl phosphonic acid)

$$(H_2O_3PCH_2)_2N(CH_2)_3N(CH_2PO_3H_2)_2$$

hepta methylene diamine tetra(methyl phosphonic acid)

$$(H_2O_3PCH_2)_2N(CH_2)_7N(CH_2PO_3H_2)_2$$

decamethylene diamine tetra(methyl phosphonic acid)

$$(H_2O_3PCH_2)_2N(CH_2)_{10}N(CH_2PO_3H_2)_2$$

tetra decamethylene diamine tetra(methyl phosphonic acid)

$$(H_2O_3PCH_2)_2N(CH_2)_{14}N(CH_2PO_3H_2)_2$$

ethylene diamine tri(methyl phosphonic acid)

$$(H_2O_3PCH_2)_2N(CH_2)_2NHCH_2PO_3H_2$$

ethylene diamine di(methyl phosphonic acid)

$$H_2O_3PCH_2NH(CH_2)_2NHCH_2PO_3H_2$$

n-hexyl amine di(methyl phosphonic acid)

$$C_6H_{13}N(CH_2PO_3H_2)_2$$

diethylamine triamine penta(methyl phosphonic acid)

$$(H_2O_3PCH_2)_2N(CH_2)_2N(CH_2PO_3H_2)(CH_2)_2N(CH_2PO_3H_2)_2$$

ethanol amine di(methyl phosphonic acid)

$$HO(CH_2)_2N(CH_2PO_3H_2)_2$$

n-hexyl-amino(isopropylidene phosphonic acid)methylphosphonic acid $$C_6H_{13}N(C(CH_3)_2PO_3H_2)(CH_2PO_3H_2)$$

trihydroxy methyl, methyl amino di(methyl phosphonic acid)

$$(HOCH_2)_3CN(CH_2PO_3H_2)_2$$

triethylene tetra amine hexa(methyl phosphonic acid)

$$(H_2O_3PCH_2)_2N(CH_2)_2N(CH_2PO_3H_2)(CH_2)_2N(CH_2PO_3H_2)(CH_2)_2N(CH_2PO_3H_2)_2$$

monoethanol, diethylene triamine tri(methyl phosphonic acid)

$$HOCH_2CH_2N(CH_2PO_3H_2)(CH_2)_2NH(CH_2)_2N(CH_2PO_3H_2)_2$$

chloroethylene amine di(methyl phosphonic acid)

$$ClCH_2CH_2N(CH_2PO(OH)_2)_2$$

The above compounds are included for illustration purposes and are not intended to be a complete listing of the compounds which are operable within the confines of the invention.

The Metal Salts

For additional corrosion protection zinc may be included in the treatment. Typical salts for zinc which may be used for the purpose are zinc chloride, zinc chlorate, zinc bromide, zinc bromate, zinc borate, zinc nitrate, zinc sulfate, zinc acetate, zinc benzoate, zinc butyrate, zinc carbonate, zinc citrate, zinc caproate, etc. Similar salts for nickel, cobalt, chromium, and cadmium may be utilized so long as the salt is water-soluble to an acceptable degree.

In special instances certain waters to be treated will need pH adjustments to insure that the system is above 5.5. In these cases, alkalis such as sodium hydroxide, sodium carbonate, potassium hydroxide, calcium hydroxide, etc. may be utilized.

In situations where it is known that acid or base addition is necessary for pH control, the acid or base may be included in the composition containing the orthophosphate compound.

SPECIFIC EMBODIMENTS

Since compositions containing the polymer (AA/-HAA) and the orthophosphate are not particularly stable when mixed as a highly active product for delivery to a user, it is desirable to treat the systems using what the industry considers a two-barrel approach, i.e., feed the ingredients separately. Since the polyphosphates, the phosphonates, and the copper corrosion inhibitors, e.g., totylthiazole, mix quite well with the orthophosphate, these are included in one drum when utilized as the treatment. It is possible, however, to blend all of the ingredients dry as powders or crystals and make the liquid form at the use site. Stability is not a significant problem when the make is used within a short time.

Accordingly, the invention contemplates the use of a composition containing the polymer and the orthophosphate and optionally but preferably the phosphonate, the polyphosphate and the copper corrosion inhibitors. A typical composition contains on a weight ratio basis of polymer to orthophosphate expressed as $PO_4^{---}$ of about 1:8 to about 4:1 and preferably about 1:6 to 2:1. When a polyphosphate* is included, the weight ratio of orthophosphate to polyphosphate on a $PO_4^{---}$ to $PO_4^{---}$ basis is 15:1 to 1:3, and preferably 2.5:1 to 1:1. Similarly, if the organo-phosphonate is included, the ratio of the orthophosphate to the phosphonate expressed as $PO_4^{31\ --}$ to $PO_4^{---}$ is 1:2 to 13:1, and preferably 2:1 to 8:1. Any copper corrosion inhibitor may be included in the composition (0.01 to 5% by weight) in an amount which will be effective for controlling the copper corrosion in a given system: 0.05 to 10 parts per million and preferably 0.5 to 5 parts per million. Similarly, zinc salts may be included if additional protection is needed.

*Betz Handbook of Industrial Water Conditioning, 6th edition, 1962, pages 394–396, Betz Laboratories, Inc., Trevose, Pa.

In treating the aqueous systems the following dosages in parts per million parts of water in said aqueous systems of the respective ingredients are desirable, with the dosages of course being based upon the severity of the corrosion problem foreseen or experienced:

orthophosphate (expressed as $PO_4^{---}$): 2 to 50 parts per million parts of water (ppm) and preferably 6 to 30 ppm;

polymer: 0.3 to 120 ppm and preferably 3 to 25 ppm of water;

polyphosphate (expressed as $PO_4^{---}$): 0.1 to 30, and preferably 3 to 10, parts per million parts of water;

phosphonate (expressed as $PO_4^{---}$): 0.04 to 20, and preferably 1 to 6 parts per million parts of water.

The preferred rate of application of this treatment to cooling water systems and the ratios of various components depends on the calcium concentration of the cooling water. The treatment is preferably applied in waters having between 15 ppm and 1,000 ppm calcium. Within this range the weight ratio of calcium to orthophosphate is varied from 1:1 to 83.3:1, the weight ratio of AA/HAA to orthophosphate is varied from 1:3 to 1.5:1.

As earlier disclosed, the orthophosphate which is critical to the present inventive treatment is generally obtained by direct addition. However, it is understood that the orthophosphate can also arise due to reversion of either inorganic polyphosphates of the organo-phosphonates, or any other appropriate source or precursor thereof.

The above dosages represent the most desirable ranges since most systems will be treatable therewith. Higher dosages are permissable when the situation demands, but of course are more costly. The effectiveness of the inventive treatments are dependent upon the aqueous medium having a pH of 5.5 and above, and preferably 6.5 to 9.5, and containing calcium ion concentrations, preferably about 15 parts per million parts of water. Below this range, it may be necessary for overall effectiveness to add metallic ions such as zinc, nickel, chromium, etc. as described in column 3, lines 4 to 24 of U.S. Pat. No. 3,837,803.

Testing and Procedures

In order to illustrate the corrosion inhibiting properties of the present inventive treatments and compositions, tests were conducted utilizing a spinner testing technique. In accordance with this technique, dried, precleaned and pre-weighed coupons of a particular metal are suspended in a water bath, the water of which has a particular constituency, for a period of time. To the water in the bath is added the corrosion inhibiting treatment to be tested in certain dosages. After the coupons (usually six specimens for a realistic study) are circulated in this environment for a predetermined amount of time they are removed, cleaned, dried and weighed to determine weight loss. This weight loss for the specified period is utilized to compute corrosion rate for a year and is reported as a corrosion rate of mils per year (mpy). The coupons are also inspected to assess the type corrosion occurring, i.e., local pitting, general corrosion, or both, and whether any deposition of scale, corrosion products, etc., has occurred.

Recorded below in Table I are the test results, the conditions of the testing, and any observations made at the end of testing as regards coupon appearance. As will be evident to the worker in this art, good corrosion inhibiting capacity with attendent deposition is of questionable value, because while corrosion may be abated, impedance of flow and lower heat transfer as regards cooling water systems have a drastic economical effect on the system.

TABLE I

| Conditions | pH = 7.0 |
|---|---|
| | Temperature = 120° F. |
| | Duration = 3 days |
| | Aeration = constant |
| | Feedwater hardness = 170 ppm $Ca^{+2}$ as $CaCO_3$ |
| | 110 ppm Mg as $CaCO_3$ |
| | 15 ppm $SiO_2$ |

Polymer No. 1:
  AA/HPA copolymer having a molecular weight of about 6,000; mole ratio of AA to HPA of 1.8:1
Polymer No. 2:
  AA/HPA copolymer having a molecular weight of about 6,000; mole ratio of AA to HPA of 3:1.
PtLCS = Pretreated low carbon steel

| Treatment, in ppm active | | | Corrosion Rate, in mpy |
|---|---|---|---|
| Polymer No. 1 | Polymer No. 2 | O—$PO_4^=$ | PtLCS |
| | | 10 | 6.6 deposition prominent on coupon |
| | | 15 | 3.3 deposition prominent on coupon |
| | | 25 | 3.1 deposition prominent |

TABLE I-continued

| | | | on coupon |
|---|---|---|---|
| 5 | 5 | 2.0 | |
| 5 | 7.5 | 2.5 | |
| 10 | 10 | 0.3 | |
| 5 | 10 | 3.0 | little deposition |
| 5 | 15 | 3.2 | " |
| 5 | 20 | 2.7 | |
| 5 | 25 | 2.0 | |
| 5 | 5 | 6.5 | little deposition |
| 5 | 7.5 | 0.5 | |
| 10 | 10 | 2.0 | |
| 5 | 10 | 3.5 | |
| 5 | 20 | 2.7 | |
| 5 | 25 | 2.3 | |

Additional testing was conducted to establish the enhanced activity of utilizing the polymer in conjunction with the combination of the phosphonic acid derivative and the orthophosphate, as referred to in Tables 4 and 5 of U.S. Pat. No. 3,837,803. The conditions of this comparative testing were exactly those as set forth in the patent, namely:

| Test Conditions | |
|---|---|
| Spinner System: | Volume 22 liters |
| Calcium ion concentration as CaCO₃: | 340 ppm |
| Magnesium ion concentration as CaCO₃: | 220 ppm |
| Chloride ion concentration: | 240 ppm |
| Sulfate ion concentration: | 210 ppm |
| Copper ion concentration: | 0.4 ppm |
| pH: | 8.0 |
| Temperature: | 120° F. |
| Flow rate: | 1.5 ft per second |
| Duration of test: | Three (3) days |
| Aeration: | Constant |
| Test specimens: | High carbon steel AISI 1090 |

In describing the test conditions the patent makes the following disclosure as pertains to the test conditions:

"One point should be explained regarding the testing conditions. The corrosion rates set forth in the Tables are relatively high for practical purposes. However, this was purposely provided for by the selection of the constituency of the aqueous testing environment. The aqueous testing medium was produced so as to provide a very corrosive environment. It was felt that if the compositions and treatment techniques of the invention were as effective as claimed, that the enhanced activity would be pronounced and easily discernible. Basically, the theory followed is that if a corrosion inhibitor is to be considered effective under generally and conventionally found conditions, it must also exhibit this effectiveness under severe and drastic conditions which are also found in particular situations and particular regions of the country. Accordingly, the severe and drastic conditions were selected for the purpose of the present testing program."

TABLE II

Data taken from Table 4 of U.S. Pat. No. 3,837,803
Evaluation of Nitrilo-tri(methylene phosphonic acid) [referred to as AMP], and Trisodium phosphate [referred to as TSP]

| Treatment | Weight Ratio AMP:TSP* | Corrosion Rate (mpy) |
|---|---|---|
| Treatment Level = 20 ppm | | |
| AMP | — | 38 |
| TSP | — | 32 |
| AMP + TSP | 1:2 | 23 |
| AMP + TSP | 1:1 | 14 |
| AMP + TSP | 2:1 | 21 |
| AMP + TSP | 5:1 | 28 |
| Treatments of U.S. Pat. No. 3,837,803 plus 20 ppm AA/HPA* | | |
| AMP + TSP (at 20 ppm) | 1:2 | 10.8 |
| AMP + TSP | 1:1 | 7.5 |
| AMP + TSP | 2:1 | 8.8 |
| AMP + TSP | 5:1 | 11.2 |

*3AA:1HPA; molecular weight about 6,000

TABLE III

Data taken from Table 5 of U.S. Pat. No. 3,837,803

| Treatment | Weight Ratio AMP:TSP | Corrosion Rate (mpy) |
|---|---|---|
| Treatment level = 40 ppm | | |
| AMP | — | 8.0 |
| TSP | — | 16 |
| AMP + TSP | 1:2 | 6 |
| AMP + TSP | 2:1 | 4 |
| AMP + TSP | 5:1 | 5.0 |
| Treatment plus 20 ppm AA/HPA* | | |
| AMP + TSP | 1:2 | 3.5 |
| AMP + TSP | 2:1 | 4.0 |
| AMP + TSP | 5:1 | 4.5 |
| Treatment: 40 ppm AA/HPA* alone | | 69.5 |

*3AA:1HPA; molecular weight about 6,000

It is clear from the above that the addition of the polymer of the present invention provided enhanced corrosion inhibition in most cases when used in conjunction with the combination of U.S. Pat. No. 3,837,803.

Additional Spinner tests were conducted to establish the benefits derived by using the polymer in conjunction with a combination of orthophosphate, polyphosphate and a phosphonic acid derivative. Tolytriazole, TTA, was also included for its copper corrosion inhibition properties.

The results and conditions of the test are recorded in the following Table IV.

TABLE IV (pH = 7-7.5)

| Test No. | Ca++ as CaCO₃ | Mg++ as CaCO₃ | Cl− | SO₄= | PO₄≡ as Orthophosphate (TSP) | PO₄≡ as Polyphosphate (TKPP) | HEDP | TTA | AA/HPA* | TT | Corrosion Rate (mpy) LSC* | % Inhibition |
|---|---|---|---|---|---|---|---|---|---|---|---|---|
| 1 | 400 | 200 | 284 | 192 | 0 | 0 | 0 | 0 | 0 | 0 | 143.5 | 0 |
| 2 | 400 | 200 | 284 | 192 | 21.6 | 10.8 | 4.32 | 5.4 | 0 | 42.12 | 1.0 | 99.3 |
| 3 | 400 | 200 | 284 | 192 | 0 | 0 | 0 | 0 | 11.25 | 11.25 | 82.3 | 42.6 |
| 4 | 400 | 200 | 284 | 192 | 12.0 | 6.0 | 2.40 | 3.0 | 5.0 | 28.40 | 0.6 | 99.6 |
| 5 | 600 | 300 | 426 | 288 | 0 | 0 | 0 | 0 | 0 | 0 | 90.3 | 0 |
| 6 | 600 | 300 | 426 | 288 | 31.2 | 15.6 | 6.24 | 7.8 | 0 | 60.84 | 0.3 | 99.7 |
| 7 | 600 | 300 | 426 | 288 | 12.0 | 6.0 | 2.40 | 3 | 10.0 | 33.40 | 0.3 | 99.7 |
| 8 | 600 | 300 | 426 | 288 | 0 | 0 | 0 | 0 | 16.25 | 16.25 | 56.0 | 38.0 |
| 9 | 600 | 300 | 426 | 288 | 33.2 | 16.6 | 6.64 | 9.9 | 0 | 66.34 | 0.7 | 99.2 |
| 10 | 600 | 300 | 426 | 288 | 15.0 | 7.5 | 3.00 | 4.5 | 10 | 40.00 | 0 | 100.0 |

TABLE IV-continued

| Test No. | Ca++ as CaCO$_3$ | Mg++ as CaCO$_3$ | Cl− | SO$_4^=$ | PO$_4^=$ as Orthophosphate (TSP) | (pH = 7-7.5) PO$_4^=$ as Polyphosphate (TKPP) | HEDP | TTA | AA/HPA* | TT** | Corrosion Rate (mpy) LSC*** | % Inhibition |
|---|---|---|---|---|---|---|---|---|---|---|---|---|
| 11 | 600 | 300 | 426 | 288 | 0 | 0 | 0 | 0 | 18.25 | 18.25 | 70.0 | 22.5 |

*3AA:HPA: molecular weight 6,000
**Total Treatment in ppm
***Low Steel

It is evident from the results of the testing that treatments including the polymer were more, or at least as, effective at lower dosages than those which did not use the polymer.

Additional studies were conducted to establish the effectiveness of one of the treatments of the invention under various conditions. The test procedure utilized is referred to as a recirculation test which is disclosed in U.S. Pat. No. 3,960,576, which is incorporated herein by reference. The conditions of testing and the results with regard to certain metallurgies are set forth in the following Table V. As will be apparent, corrosion rate, corrosion type, and deposition, if any, are noted for both coupons and tubing used.

Field Studies

Actual testing of the inventive concept was conducted at various industrial sites under production operating conditions. These case studies are detailed below.

Case Study No. 1—A midwestern refinery was successfully using a zinc/phosphate/dispersant treatment program to control corrosion in an open recirculating cooling system, but was experiencing fouling in critical heat exchange equipment which impeded heat transfer and necessitated periodic shut-downs. Prior to using the zinc/phosphate/dispersant treatment, conventional phosphate/dispersant treatments were unsuccessful in controlling both fouling and tuberculation corrosion in TABLE V
AA/HPA Concentration Versus Calcium Hardness

| Test No. | Treatment, conc. in ppm | | | | | Water Chemistry | | | | | | | Corrosion Rate (mpy) | | |
|---|---|---|---|---|---|---|---|---|---|---|---|---|---|---|---|
| | AA/HPA* ppm Actives | TSP as O—PO$_4$ | TKPP as PO$_4$ | HEDP | HZT | pH | Ca as CaCO$_3$ | Mg as CaCO$_3$ | SO$_4$ | Cl | M Alk as CaCO$_3$ | Cond Mmho | LCS | PtLCS | ADM |
| 1 | 5.0 | 12 | 6.0 | 2.4 | 2 | 7.0 | 80 | 40 | 40 | 56 | 0 | | 2.0 | 0 | 0 |
| 2 | 5.0 | 15 | 3.5 | 2.4 | 2 | 7.0 | 170 | 110 | 110 | 119 | 0 | | 1.3 | 0.5 | 0 |
| 3 | 7.5 | 15 | 3.5 | 2.4 | 2 | 6.5 | 400 | 200 | 200 | 280 | 20 | | 4.0 | 5.0 | 1.2 |
| 4 | 7.5 | 12 | 6.0 | 2.4 | 2 | 7.4 | 400 | 200 | 200 | 280 | 32 | | 0.8 | 0 | 0.3 |
| 5 | 10.0 | 12 | 6.0 | 2.4 | 2 | 7.3 | 600 | 300 | 400 | 420 | 26 | 2100 | 0.6 | 0.2 | 0 |
| 6 | 5.0 | 12 | 6.0 | 2.4 | 2 | 7.0 | 900 | 450 | 450 | 630 | 0 | | 1.0 | 0.7 | 0.8 |
| 7 | 10.0 | 12 | 6.0 | 2.4 | 2 | 7.0 | 800 | 400 | 400 | 560 | 0 | 2400 | 0.8 | 1.5 | 1.5 |
| 8 | 5.0 | 6 | 3.0 | 1.2 | 1 | 7.0 | 800 | 400 | 400 | 560 | 0 | | 1.5 | — | 0 |
| 9 | 15.0 | 9 | 4.5 | 1.8 | 1.5 | 7.0 | 800 | 400 | 400 | 560 | 0 | | 0 | — | 0 |

| Test No. | Deposition | | | | Corrosion Type | | | | Days Run |
|---|---|---|---|---|---|---|---|---|---|
| | Coupons | | Dep. Tube | | Coupons | | Dep. Tube | | |
| | LCS | PtLCS | LCS | PtLCS | LCS | PtLCS | LCS | PtLCS | |
| 1 | None | | | | | | General | | 4 |
| 2 | None | | | | | | General | | 6 |
| 3 | Very slight film | | | | | | General | | 7 |
| 4 | Film | None | Thin Film | Thin Film | | | General | | 7 |
| 5 | Sl loc | None | None | None | | | General | | 7 |
| 6 | Film | | | | | | General | | 5 |
| 7 | Thin Film | None | Film | Thin Film | | | General | | 4 |
| 8 | Thk Film | None | Thk Film | None | Gen | Gen | Loc | Loc | 2 |
| 9 | None | | | | | | General | | 4 |

LCS = Low Carbon Steel
PtLCS = Pretreated Low Carbon Steel
ADM = Admiralty
AA/HPA = 3:1: molecular weight about 6,000
BZT = Benzotriazole
Gen = General Corrosion
Loc = Localized Corrosion/Deposition
Thk = Thick
Sl = Slight
Conditions:
Bulk Water Temperature = 120° F.
Heat Flux = 8000 BTU/ft$^2$/hr
Water Velocity = 2 ft/sec (coupons) 3 ft/sec (deposition tube)
Make-up Rate = one system volume/day
Recirculating System It is clear that the inventive treatment provides superb corrosion control with little or no attendent deposition problems.

mild steel heat exchangers.

Comparative studies were run with the zinc/phosphate/dispersant treatment (applied at a concentration that would give 2 ppm zinc and 3 to 5 ppm orthophosphate in the recirculating water) and a composition of this invention (applied at a concentration that would give 5 ppm AA/HPA polymer and 10 to 15 ppm orthophosphate in the recirculating water) for a six week period in an open recirculating cooling system having a total recirculation rate of 12,000 gpm and a 15° F. temperature drop across the cooling tower. Cold lime-softened well water was used as make-up to maintain the recirculating water at 3 cycles of concentration. Analysis of the recirculating water typically gave 384 ppm total hardness (as ppm $CaCO_3$), 283 ppm calcium hardness (as ppm $CaCO_3$), 10 ppm methyl orange alkalinity (as ppm $CaCO_3$), 60 ppm silica (as ppm $SiO_2$), and 1139 micromhos conductivity. The recirculating water was controlled at pH=7 with sulfuric acid. A critical, mild steel process heat exchanger was cleaned prior to each trial and inspected after the six week trial period to assess the performance of each of the treatments. During the trials, mild steel (AISI-1010) and admiralty brass corrosion rates were measured.

At the end of the zinc/phosphate/dispersant trial, a uniform deposit coated the entire heat transfer surface of the process exchanger and tuberculation corrosion was noticeably evident. Corrosion rates during the trial period were 5.6 mpy for mild steel and 0.9 mpy for admiralty brass.

At the end of the AA/HPA-phosphate treatment program trial, the heat transfer surface of the process exchanger was deposit-free and did not show any signs of active corrosion. Additionally, inspection of other heat exchangers which were not cleaned prior to the AA/HPA-phosphate treatment trial revealed they were significantly cleaner than before the trial, indicating the treatment facilitated the removal of existing deposits. Corrosion rates during this trial were 1.0 mpy for mild steel and 0.0 mpy for admiralty brass.

In the above case it should be noted that the actual treatment was:

10.2 ppm $O—PO_4^{---}$; 5.1 ppm pyrophosphate; 2 ppm Hydroxyethylidene diphosphonic acid; and 2.6 ppm totylriazole 5 ppm AA/HPA (3:1; Molecular weight about 6,000)

Case Study No. 2—A midwestern petrochemical plant was using a conventional phosphate/dispersant program in their open recirculating cooling system to control corrosion. With the phosphate/dispersant treatment (applied at a concentration that would give 3 ppm orthophosphate in the recirculating water), mild steel (AISI-1010) corrosion rates averaged 15 mpy with severe pitting corrosion present, and fouling of heat transfer surfaces in process equipment was a chronic problem. The cooling system had a history of pH upsets and control problems which made corrosion and deposition control difficult. The cooling system operated at a recirculation rate of 15,000 gpm with an 18° F. temperature drop across the cooling tower. Untreated well water was used as make-up to maintain the recirculating water at 2.5 cycles of concentration. Analysis of the recirculating water typically gave: 1230 ppm total hardness (as ppm $CaCO_3$), 740 ppm calcium hardness (as ppm $CaCO_3$), 40 ppm methyl orange alkalinity (as ppm $CaCO_3$), 34 ppm silica (as ppm, $SiO_2$) and 2360 micromhos conductivity.

Application of a composition of this invention applied at a concentration that would give 15 ppm AA/HPA polymer and 10 to 15 ppm orthophosphate was made to the cooling system, with the pH being controlled at 7. Over an 8-month period, mild steel corrosion rates were 1.9 mpy without any significant pitting corrosion present. Additionally, no fouling problems were incurred with process equipment. Monitoring of heat transfer coefficients (U) of a process exchanger indicated fouling had subsided after the application of the AA/HPA-phosphate treatment.

In this case study the actual treatment concentrations were:

10.2 ppm $O-PO_4^{---}$; 5.1 pyrophosphate; 2 ppm hydroxyethylidene diphosphonic acid; and 1.7 ppm benzotriazole (BZT)

15 ppm AA/HPA (3:1; molecular weight about 6,000)

Case Study No. 3—A west coast facility, operating an open recirculating cooling system with calcium hardness levels typically below 100 ppm (as ppm $CaCO_3$) in the recirculating water, had always found it necessary to supplement its phosphate/dispersant treatment with zinc, to control mild steel corrosion. The addition of zinc was necessary because the phosphate/dispersant treatment alone was unable to establish an adequate diffusion barrier film in the low hardness water. Mild steel corrosion rates were as high as 9 mpy, with pitting corrosion occasionally a problem. The cooling system operated at a recirculation rate of 15,000 gpm with an 8° F. temperature drop across the tower. River water was used as make-up to maintain the recirculating water at 1.5 cycles of concentration.

Application of a composition of this invention (applied at a concentration that would give 5 ppm AA/HPA polymer and 12 to 16 ppm orthophosphate in the recirculating water) eliminated the pitting corrosion and reduced mild steel corrosion rates to 1.4 mpy, without incurring any fouling problems.

The actual concentrations applied in this case study were:

12 ppm $O-PO_4^{---}$; 6 ppm tetrapotassium pryophosphate; 2.4 ppm hydroxyethylidene diphosphonic acid; and 2 ppm benzotriazole 5 ppm AA/HPA (3:1, molecular weight about 6,000)

In summary then, the laboratory data and the field studies clearly indicate the advancement provided by the treatments of the present invention.

Having thus described the invention, what we claim is:

1. A method of inhibiting the corrosion of ferrous metal parts in contact with an aqueous solution with little or no attendant deposition of scale on said ferrous parts, which corrosion inhibition is obtained by providing for the formation of a protective passive oxide film on the metal surface in contact with said aqueous medium, which method comprises
   (i) assuring that the pH of said aqueous medium is 5.5 or above;
   (ii) assuring that the aqueous medium contains a calcium or other appropriate ion concentration selected from the group consisting of zinc, nickel and chromium and mixtures thereof; and
   (iii) adding to said aqueous medium
      (a) a water-soluble polymer comprising moieties derived from an acrylic acid or water-soluble salt thereof and moieties of an hydroxylated lower alkyl acrylate, wherein the moieties of the polymer having the following formulas:

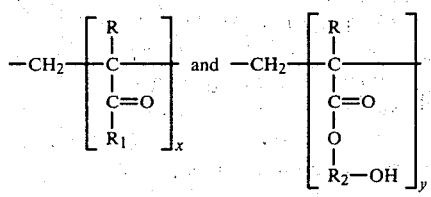

wherein R is hydrogen or a lower alkyl of from 1 to 3 carbon atoms; $R_1$ is OH, OM or $NH_2$ where M is a water-soluble cation; $R_2$ is a lower alkyl of from about 2 to 6 carbon atoms and the mole ratio of x:y is 34:1 to 1:4; and (b) a water-soluble orthophosphate compound; said polymer being such that together with the orthophosphate compound is effective to promote the metal oxide film with no attendant deposition, and the amount of (a) and (b) being added being sufficient to provide a substantially scale-free protective passive oxide film on the metallic surface.

2. The method of claim 1, wherein the weight ratio of said polymer to said orthophosphate expressed as $PO_4^{---}$ is from about 1:6 to about 2:1.

3. A method according to claim 1, wherein the orthophosphate (expressed as $PO_4^{---}$) is added to said aqueous medium in an amount of about 6 to 30 parts per million parts of water and said polymer is added in an amount of from 3 to 25 parts per million parts of water.

4. A method according to claim 2, wherein the orthophosphate (expressed as $PO_4^{---}$) is added to said aqueous medium in an amount of about 6 to 30 parts per million parts of water and said polymer is added in an amount of from 3 to 25 parts per million parts of water.

5. A method according to claim 4, wherein the pH is maintained or adjusted within the range of 6.5 to 9.5 and said calcium ion concentration is 15 parts per million parts of water or above.

6. A method according to claim 1, wherein additionally is added to said aqueous medium a water-soluble organo phosphonic acid compound or its water-soluble salts.

7. A method according to claim 6, wherein the weight ratio of compounds and polymer added are as follows:

said polymer to said orthophosphate compound expressed as $PO_4^{---}$ is from about 1:6 to about 2:1; and said orthophosphate expressed as $PO_4^{---}$ to said organo phosphonic acid compound expressed as $PO_4^{---}$ is from about 2:1 to 8:1.

8. A method according to claim 7, wherein the compounds and polymer are added to said aqueous medium as follows:

orthophosphate compound expressed as $PO_4^{---}$: 6 to 30 parts per million parts of water;

organo phosphonic acid compound expressed as $PO_4^{---}$: 1 to 6 parts per million parts of water; and polymer: 3 to 25 parts per million parts of water.

9. A method according to claim 7, wherein the pH of the aqueous medium is adjusted or maintained at about 6.5 to 9.5 and the calcium ion concentration is 15 parts per million parts of water or above.

10. A method according to claim 1, wherein the aqueous medium is contained in a cooling water system.

11. A method according to claim 9, wherein the aqueous medium is contained in a cooling water system.

12. A method according to claim 7, wherein R is hydrogen and $R_2$ is a lower alkyl of 3 carbon atoms.

13. A method of inhibiting the corrosion of ferrous metal parts in contact with an aqueous solution with little or no attendant deposition of scale on said ferrous parts, which corrosion inhibition is obtained by providing for the formation of a protective passive oxide film on the metal surface in contact with said aqueous medium, which method comprises (i) assuring that the pH of said aqueous medium is 5.5 or above;

(ii) assuring that the aqueous medium contains a calcium or other appropriate ion concentration selected from the group consisting of zinc, nickel and chromium and mixtures thereof; and (iii) adding to said aqueous medium (a) a water-soluble polymer comprising moieties derived from an acrylic acid or water-soluble salt thereof and moieties of an hydroxylated lower alkyl acrylate, wherein the moieties of the polymer have the following formulas:

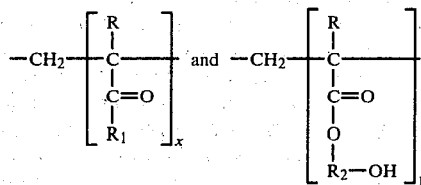

wherein R is hydrogen or a lower alkyl of from 1 to 3 carbon atoms; $R_1$ is OH, OM or $NH_2$ where M is a water-soluble cation; $R_2$ is a lower alkyl of from about 2 to 6 carbon atoms and the mole ratio of x:y is 34:1 to 1:4; and (b) a water-soluble orthophosphate compound; and (c) a water-soluble polyphosphate compound; said polymer being such that together with the orthophosphate compound is effective to promote the metal oxide film with no attendant deposition, and the amount of (a), (b) and (c) being added being sufficient to provide a substantially scale-free protective passive oxide film on the metallic surface.

14. A method according to claim 13, wherein the weight ratio of said compounds and polymer are:

polymer to orthophosphate expressed as $PO_4^{---}$ of about 1:6 to 2:1; and orthophosphate expressed as $PO_4^{---}$ to polyphosphate expressed as $PO_4^{---}$ of about 2.5:1 to 1:1.

15. A method according to claim 14, wherein the compounds and the polymer are added to the aqueous medium in the following amounts:

orthophosphate expressed as $PO_4^{---}$: 6 to 30 parts per million parts of water;

polymer: 3 to 25 parts per million parts of water; and polyphosphate expressed as $PO_4^{---}$: 3 to 10 parts per million parts of water.

16. A method according to claim 15, wherein the pH of the aqueous medium is adjusted or maintained within the range of 6.5 to 9.5 and said calcium ion concentration in the water is 15 parts per million parts of water or above.

17. A method according to claim 16, wherein a copper corrosion inhibitor selected from the group consisting of benzotriazole compounds and benzothiazole compounds is added to said aqueous medium in an amount of from 0.5 to 5 parts per million parts of water.

18. A method according to claim 16, wherein R is hydrogen $R_2$ is a lower alkyl of 3 carbon atoms.

19. A method according to claim 18, wherein a copper corrosion inhibitor selected from the group consisting of benzotriazole compounds and benzothiazole compounds is added to said aqueous medium in an amount of from 0.5 to 5 parts per million parts of water.

20. A method according to claim 16, wherein the aqueous medium is contained in a cooling water system.

21. A method according to claim 18, wherein the aqueous medium is contained in a cooling water system.

22. A method according to claim 13, wherein additionally a water-soluble organo phosphonic acid compound is added to the aqueous medium and the weight ratio of the compounds and polymer are as follows:
polymer to orthophosphate expressed as $PO_4^{---}$: about 1:6 to about 2:1;
orthophosphate to polyphosphate both expressed as $PO_4^{---}$: about 2.5:1 to about 1:1;
orthophosphate to said organo phosphonate both expressed as $PO_4^{---}$: about 2:1 to about 8:1.

23. A method according to claim 22, wherein the compounds and polymer are added to the aqueous medium in the following amounts:
orthophosphate compound expressed as $PO_4^{---}$: about 6 to 30 parts per million parts of water;
polyphosphate compound expressed as $PO_4^{---}$: about 3 to 10 parts per million parts of water;
phosphonic acid compound expressed as $PO_4^{---}$: about 1 to 6 parts per million parts of water; and
polymer: about 3 to 25 parts per million parts of water.

24. A method according to claim 23, wherein the pH of the aqueous medium is adjusted or maintained within the range of 6.5 to 9.5 and the calcium ion concentration is 15 parts per million parts of water or above.

25. A method according to claim 24, wherein a copper corrosion inhibitor is added to said aqueous medium in the amount of about 0.5 to 5 parts per million parts of water.

26. A method according to claim 24, wherein said aqueous medium is contained in a cooling water system.

27. A method according to claim 25, wherein said aqueous medium is contained in a cooling water system.

28. A method according to claim 13, wherein the hydroxy alkyl acrylate is hydroxy propyl acrylate and the ratios of the acrylic acid moieties to said hydroxy propyl acrylate moieties is about 3:1 and the polymer has a molecular weight of about 6,000.

29. A method according to claim 28, wherein the aqueous medium is the cooling water of a cooling water system.

30. A method according to claim 29, wherein a copper corrosion inhibitor is added and said inhibitor is selected from the group consisting of tolyltriazole, benzotriazole, and benzothiazole compounds.

31. A method according to claim 28, wherein the hydroxy alkyl acrylate is hydroxy propyl acrylate and the ratios of the acrylic acid moieties to said hydroxy propyl acrylate moieties is about 3:1 and the polymer has a molecular weight of about 6,000, and said organo phosphonic acid compound is hydroxyethylidene diphosphonic acid or its water-soluble salt.

32. A composition for providing a protective passive oxide film on the surface of a ferrous metallic part in contact with an aqueous solution with little or no attendant deposition of scale on said part, which comprises
(i) a water-soluble polymer consisting essentially of moieties derived from an acrylic acid or water-soluble salt thereof and moieties of an hydroxylated lower alkyl acrylate, wherein the moieties of the polymer have the following formulas:

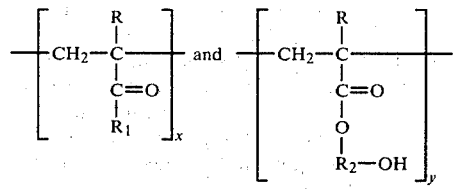

wherein R is hydrogen or a lower alkyl of from 1 to 3 carbon atoms; $R_1$ is OH, OM or $NH_2$ where M is a water-soluble cation; $R_2$ is a lower alkyl of from about 2 to 6 carbon atoms and the mole ratio of x:y is 34:1 to 1:4; and
(ii) a water-soluble orthophosphate compound, the ratio on a weight basis of the polymer to the orthophosphate expressed as $PO_4^{---}$ being from about 1:8 to about 4:1.

33. A composition according to claim 32, wherein the hydroxy alkyl acrylate is hydroxy propyl acrylate and the ratios of the acrylic acid moieties to said hydroxy propyl moieties is about 3:1 and the polymer has a molecular weight of about 6,000.

34. A composition according to claim 32, which additionally contains a compound selected from the group consisting of an organo phosphonic acid compound or derivatives thereof and a copper corrosion inhibitor selected from the group of benzothiazole compounds and benzotriazole compounds, or mixtures thereof.

35. A composition according to claim 34, wherein the organo phosphonic acid derivative and said compound is present in said composition on a weight ratio of orthophosphate to organo phosphonic derivative both expressed as $PO_4^{---}$ of about 1:2 to about 13:1.

36. A composition according to claim 35, which contains a mixture of copper corrosion inhibitors and said organo phosphonic acid derivative.

37. A composition according to claim 36, wherein the copper corrosion inhibitor is tolyltriazole.

38. A composition according to claim 35, wherein the hydroxy alkyl acrylate is an hydroxy propyl acrylate, and the phosphonic acid derivative is hydroxyethylidene diphosphonic acid or its water-soluble salt.

39. A composition for providing a protective passive oxide film on the surface of a metallic part in contact with an aqueous solution with little or no attendant deposition of scale on said part, which comprises
(i) a water-soluble polymer consisting essentially of moieties derived from an acrylic acid or water-soluble salt thereof and moieties of an hydroxylated lower alkyl acrylate, wherein the moieties of the polymer have the following formulas:

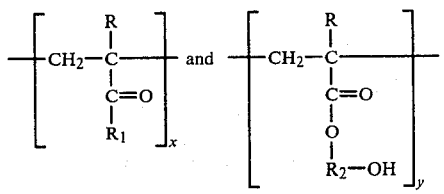

wherein R is hydrogen or a lower alkyl of from 1 to 3 carbon atoms; $R_1$ is OH, OM or $NH_2$ where M is a water-soluble cation; $R_2$ is a lower alkyl of from about 2 to 6 carbon atoms and the mole ratio of x:y is 34:1 to 1:4;

(ii) a water-soluble orthophosphate compound, the ratio on a weight basis of the polymer to the orthophosphate expressed as $PO_4^{---}$ being from about 1:8 to about 4:1, and (iii) a water-soluble polyphosphate compound, the ratio of orthophosphate to polyphosphate both expressed as $PO_4^{---}$ being about 15:1 to about 1:3.

40. A composition according to claim 39, wherein the hydroxy alkyl acrylate is hydroxy propyl acrylate.

41. A composition according to claim 40, wherein the ratios of the acrylic acid moieties to said hydroxy propyl acrylate moieties is about 3:1 and the polymer has a molecular weight of about 6,000.

42. A composition according to claim 39, which additionally contains a compound selected from the group consisting of an organo phosphonic acid compound or derivatives thereof and a copper corrosion inhibitor selected from the group consisting of benzothiazole compounds and benzotriazole compounds, or mixtures thereof.

43. A composition according to claim 42, wherein the compound is an organo phosphonic acid derivative and said compound is present in said composition on a weight ratio of orthophosphate to organo phosphonic derivative both expressed as $PO_4^{---}$ of about 1:2 to about 13:1.

44. A composition according to claim 43, which contains a mixture of said copper inhibitor and said organo phosphonic acid.

45. A composition according to claim 44, which contains a copper corrosion inhibitor selected from the group consisting of tolyltriazole, benzotriazole compounds, and benzothiazole compounds.

46. A composition according to claim 43, wherein the hydroxy alkyl acrylate is an hydroxy propyl acrylate, and the phosphonic acid derivative is hydroxyethylidene diphosphonic acid or its water-soluble salt.

* * * * *